June 21, 1960 J. J. SHARP 2,942,242

INFORMATION READING ARRANGEMENT

Filed March 11, 1958 8 Sheets-Sheet 1

INVENTOR
JOHN JOSHUA SHARP
BY Kane and Nydick
ATTORNEYS

June 21, 1960 J. J. SHARP 2,942,242

INFORMATION READING ARRANGEMENT

Filed March 11, 1958 8 Sheets-Sheet 2

INVENTOR
JOHN JOSHUA SHARP
BY Kane and Nydick
ATTORNEYS

June 21, 1960 — J. J. SHARP — 2,942,242

INFORMATION READING ARRANGEMENT

Filed March 11, 1958 — 8 Sheets-Sheet 3

INVENTOR
JOHN JOSHUA SHARP
BY Hane and Nydick
ATTORNEY

INVENTOR
JOHN JOSHUA SHARP
BY Haseltine and Nydick
ATTORNEYS

June 21, 1960 J. J. SHARP 2,942,242

INFORMATION READING ARRANGEMENT

Filed March 11, 1958 8 Sheets-Sheet 5

INVENTOR
JOHN JOSHUA SHARP
BY Hane and Nydick
ATTORNEYS

June 21, 1960 J. J. SHARP 2,942,242

INFORMATION READING ARRANGEMENT

Filed March 11, 1958 8 Sheets-Sheet 6

INVENTOR
JOHN JOSHUA SHARP
BY Kane and Nydick
ATTORNEYS

June 21, 1960 J. J. SHARP 2,942,242

INFORMATION READING ARRANGEMENT

Filed March 11, 1958 8 Sheets-Sheet 7

INVENTOR
JOHN JOSHUA SHARP
BY Hane and Nydick
ATTORNEYS

June 21, 1960 J. J. SHARP 2,942,242

INFORMATION READING ARRANGEMENT

Filed March 11, 1958

8 Sheets-Sheet 8

INVENTOR
JOHN JOSHUA SHARP
BY Hane and Nydick
ATTORNEYS 2,942,242

INFORMATION READING ARRANGEMENT

John Joshua Sharp, Stevenage, England, assignor to International Computers and Tabulators Limited, London, England Filed Mar. 11, 1958, Ser. No. 720,780

Claims priority, application Great Britain Apr. 24, 1957

23 Claims. (Cl. 340—174)

Figure 1:
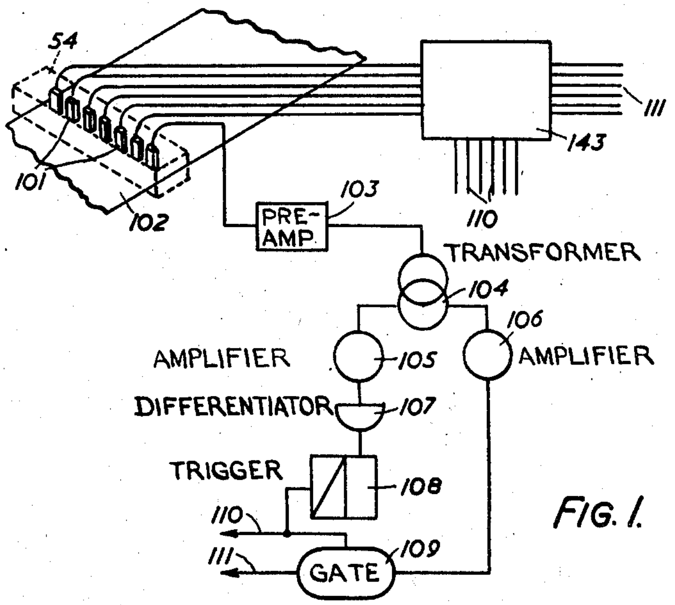

This invention relates to apparatus for reading information recorded on an information bearing medium and for controlling the transfer of discrete items or blocks of the recorded information to utilisation device, such as a computer or a printing or punching mechanism.

The use of media such as magnetic or paper tape for information recording in association with computers is well known. In general, such a tape may be used either as a slow speed store for the computer, or as an output buffer store. If the tape is used as a slow speed store, information is read from the tape into the working store of the computer and information may be recorded on the tape from the working store. Thus the tape acts as an extension of the working store during computing.

When the tape is used as an output buffer store, the results of computation are recorded on the tape by the computer. The tape is then usually removed and placed in a separate reading device which reads the recorded results and controls an output device such as a typewriter or a card punch. This arrangement allows the computer to deal with another problem whilst the results of the previous computation are being printed or punched under control of the tape.

It will be appreciated that it may be difficult or even impossible to synchronise mechanically the feeding of a recorded tape with the operation of the device which is receiving information read from the tape. This fact complicates the reading out of discrete items or blocks of information from the tape.

It is an object of the invention to provide apparatus for reading information recorded on an information bearing medium and for effecting transfer of discrete items or blocks of the recorded information to a utilisation device, under control of the utilisation device and information read from the medium.

It is a further object of the invention to control feeding of an information bearing tape to select a predetermined block of information for reading out.

It is another object of the invention to check the accuracy of information read from an information bearing tape and to control the feeding of the tape in accordance with the result of the checking.

According to one feature of the invention apparatus for transferring data from a data bearing tape, the data being recorded in discrete information blocks arranged along the length of the tape, each block being preceded and followed by a recording of marker code signals comprises feeding and sensing means for the tape, a utilisation device, signal gating means connected between the sensing means and the utilisation device, means adapted to initiate feeding of the tape past the sensing means in response to a signal from the utilisation device, means responsive to the sensing of the marker code signals preceding a block and adapted to render the gating means operative to pass to the utilisation device signals representing the information recorded in said block, and means responsive to the sensing of the marker code signals following said block to terminate the feeding of the tape before the next information block is fed past the sensing means.

According to a further feature of the invention apparatus for transferring data from a data bearing tape, the data being recorded in discrete information blocks arranged along the length of the tape, each block being preceded and followed by a recording of marker code signals, comprises feeding and sensing means for the tape, a utilisation device, signal gating means connected between the sensing means and the utilisation device, means adapted to initiate feeding of the tape past the sensing means in response to a signal from the utilisation device, means responsive to the sensing of marker code signals preceding a block and adapted to render the gating means operative, means for detecting an error in the sensing of said block, means controlled by said error detecting means and operable to control the tape feeding means to effect a further sensing of said block if it is incorrectly sensed and means responsive to the sensing of the marker code signals following said block to terminate the feeding of the tape if said block is correctly sensed.

According to another feature of the invention apparatus for transferring data from a data bearing tape, the data being recorded in discrete information blocks arranged along the length of the tape, each block being preceded and followed by a recording of marker code signals, and an incorrectly recorded block being followed by a recording of error code signals, comprises feeding and sensing means for the tape, a utilisation device, signal gating means connected between the sensing means and the utilisation device, means adapted to initiate sensing of a block by feeding of the tape past the sensing means in response to a signal from the utilisation device, means for detecting the sensing of an incorrectly recorded block, and means operable to terminate feeding of the tape in response to the sensing of marker block signals following a correctly recorded block and to the sensing of error code signals following an incorrectly recorded block.

According to a further feature of the invention apparatus for transferring data from a data bearing tape, the data being recorded in discrete information blocks arranged along the tape, comprises feeding and sensing means for the tape, a utilisation device, signal gating means connected between the sensing means and the signal utilisation device, means adapted to initiate sensing of an information block by feeding of the tape past the sensing means in response to a signal from the utilisation device, means responsive to sensed signals and adapted to render the signal gating means operative to pass to the utilisation device signals representing a recorded information block, means for detecting errors in the sensed signals and means controlled by said error detecting means and adapted to render the utilisation device non-responsive to signals representing an information block for which an error was detected.

Figure 3:
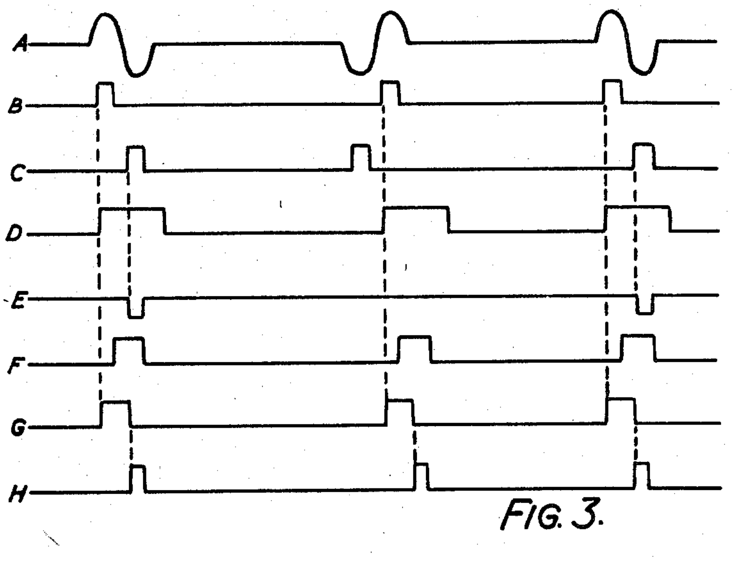
Figure 2:
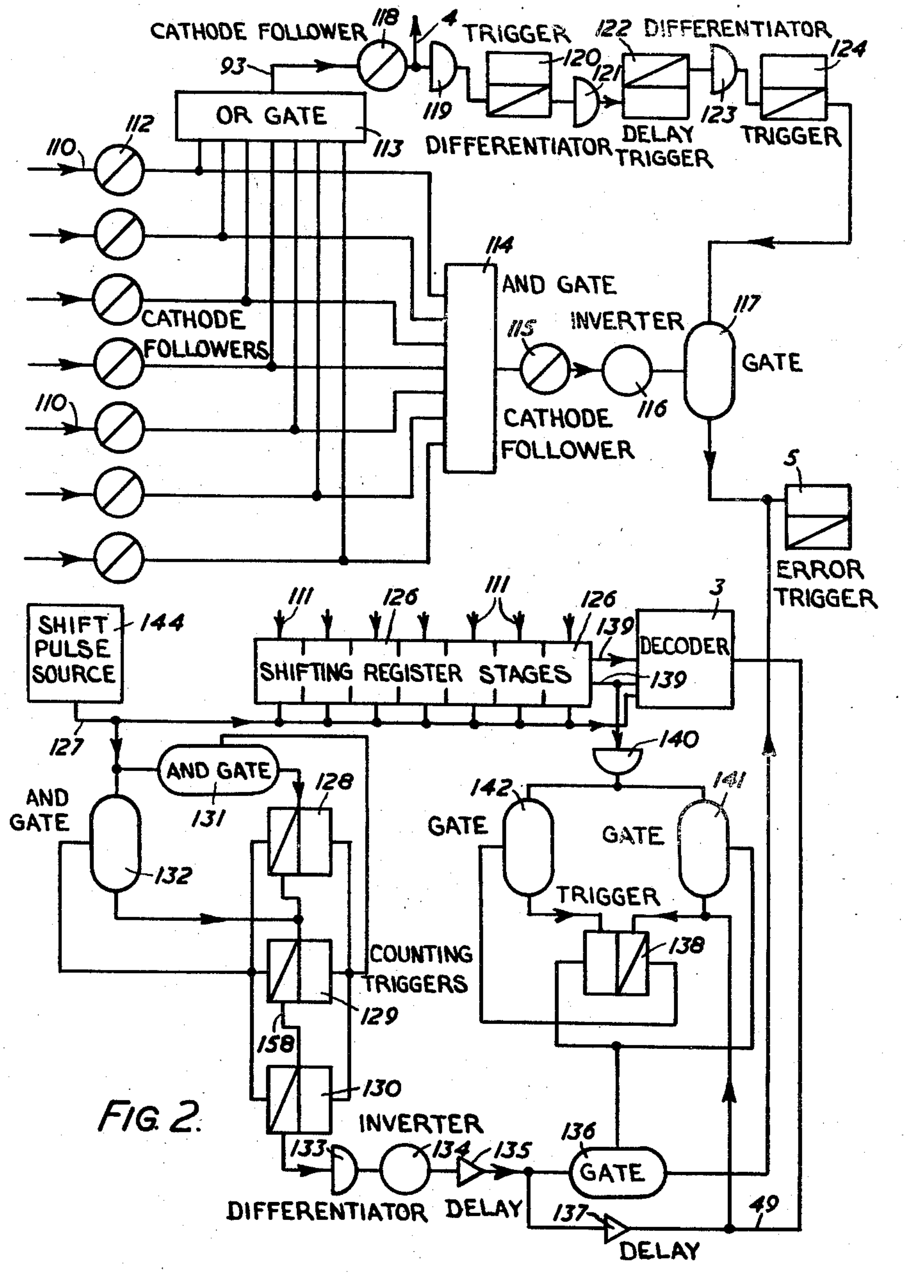
Figure 4:
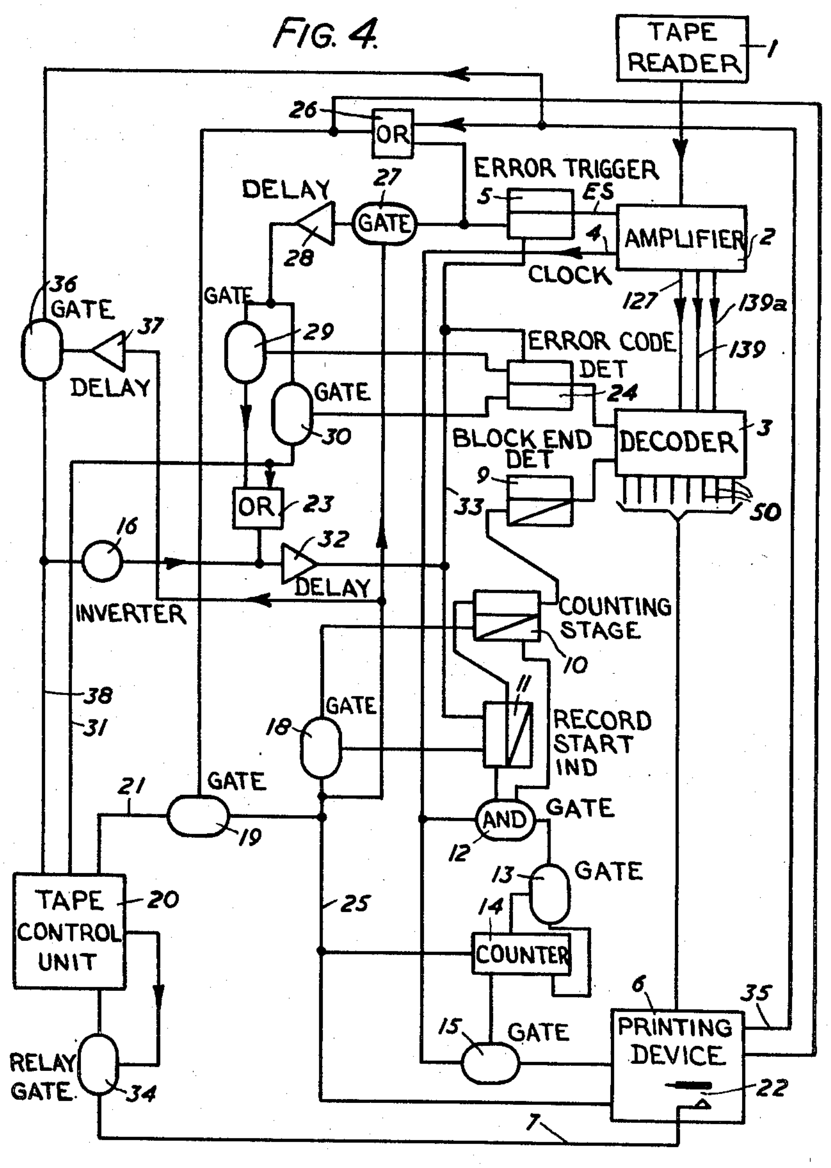
Figure 5:
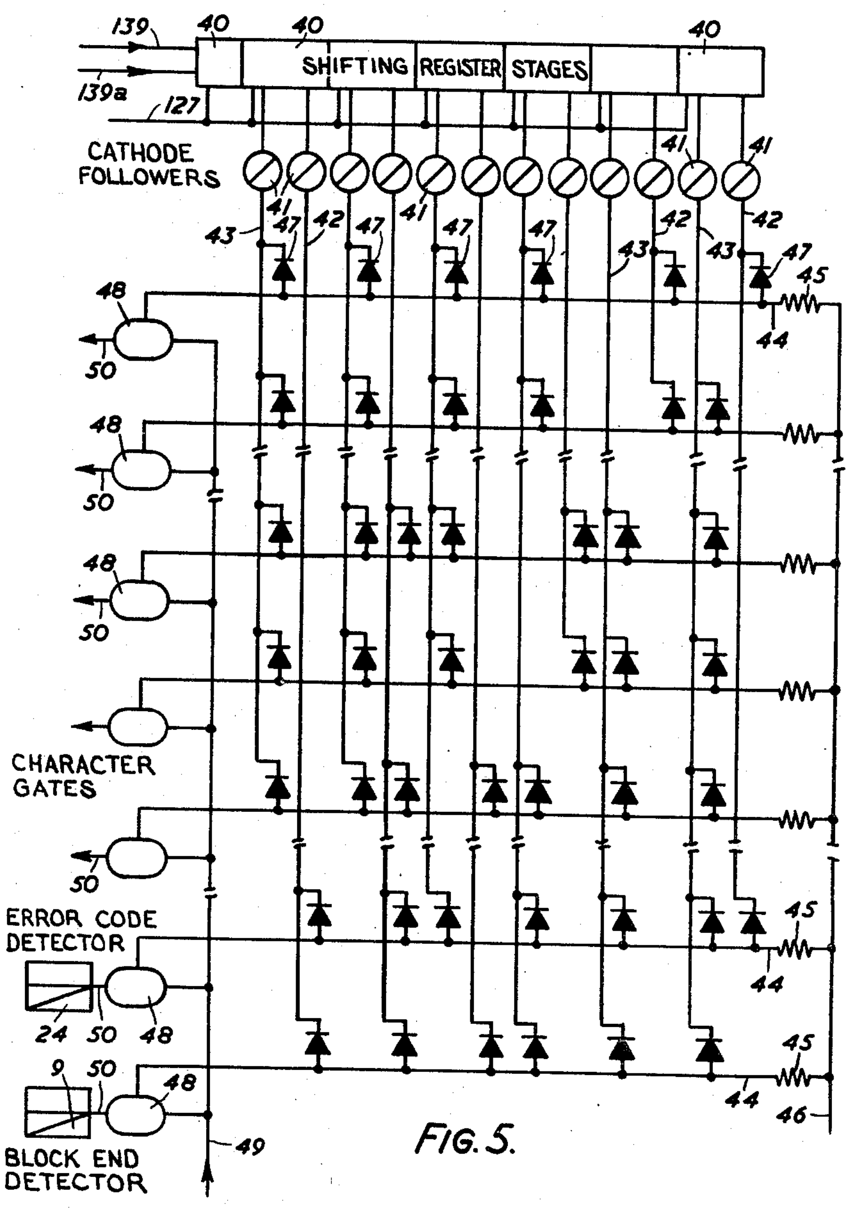
Figure 6:
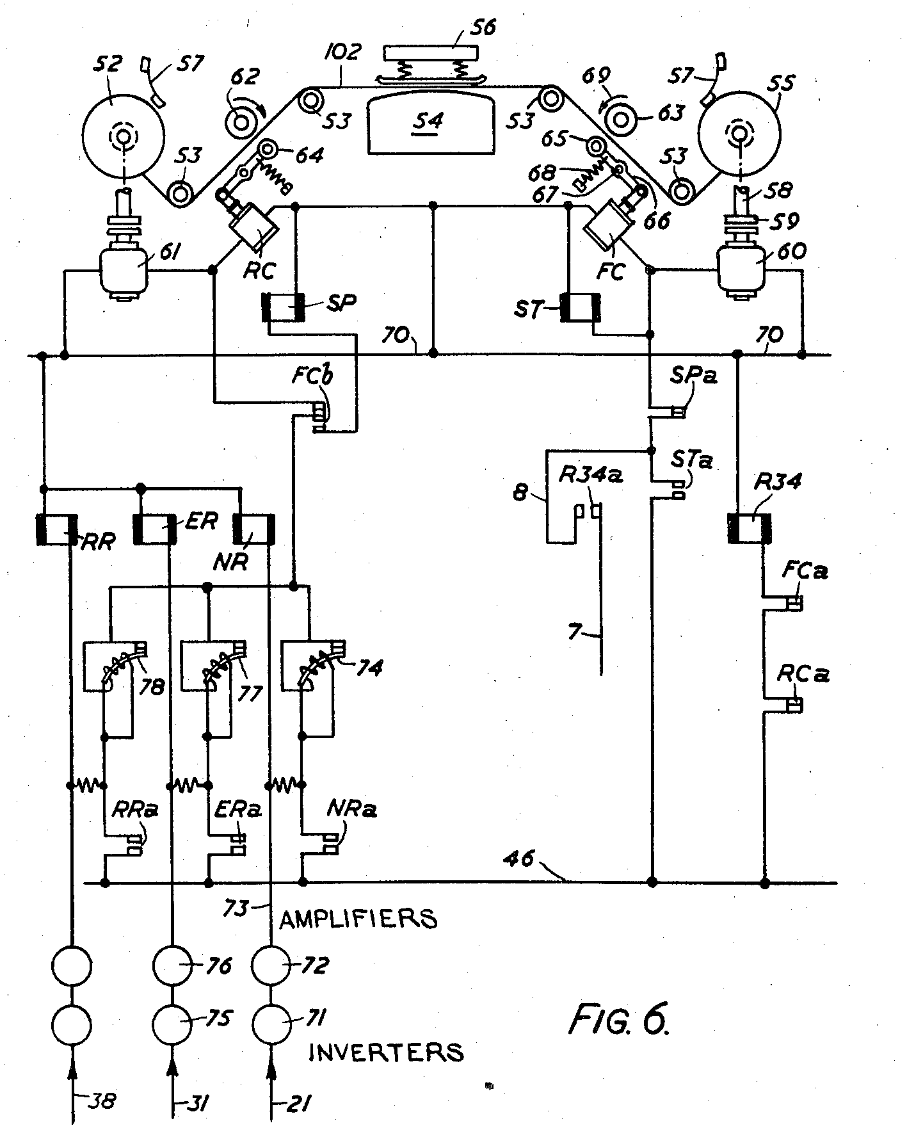
Figure 7:
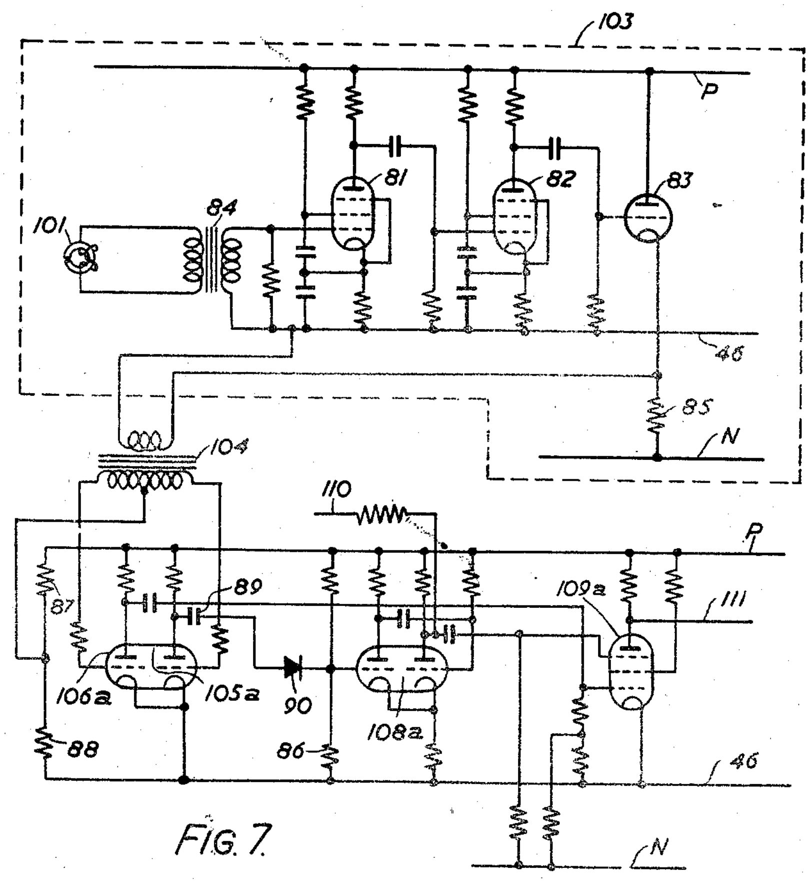
Figure 8:
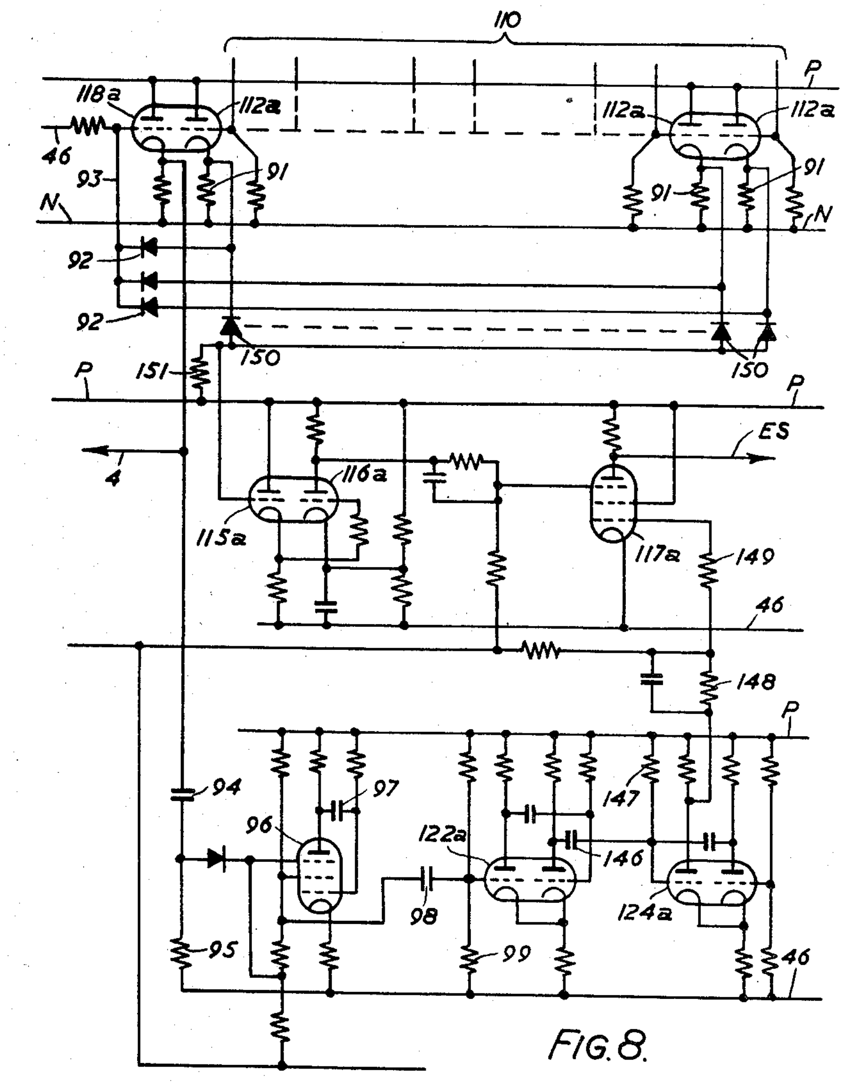
Figure 9:
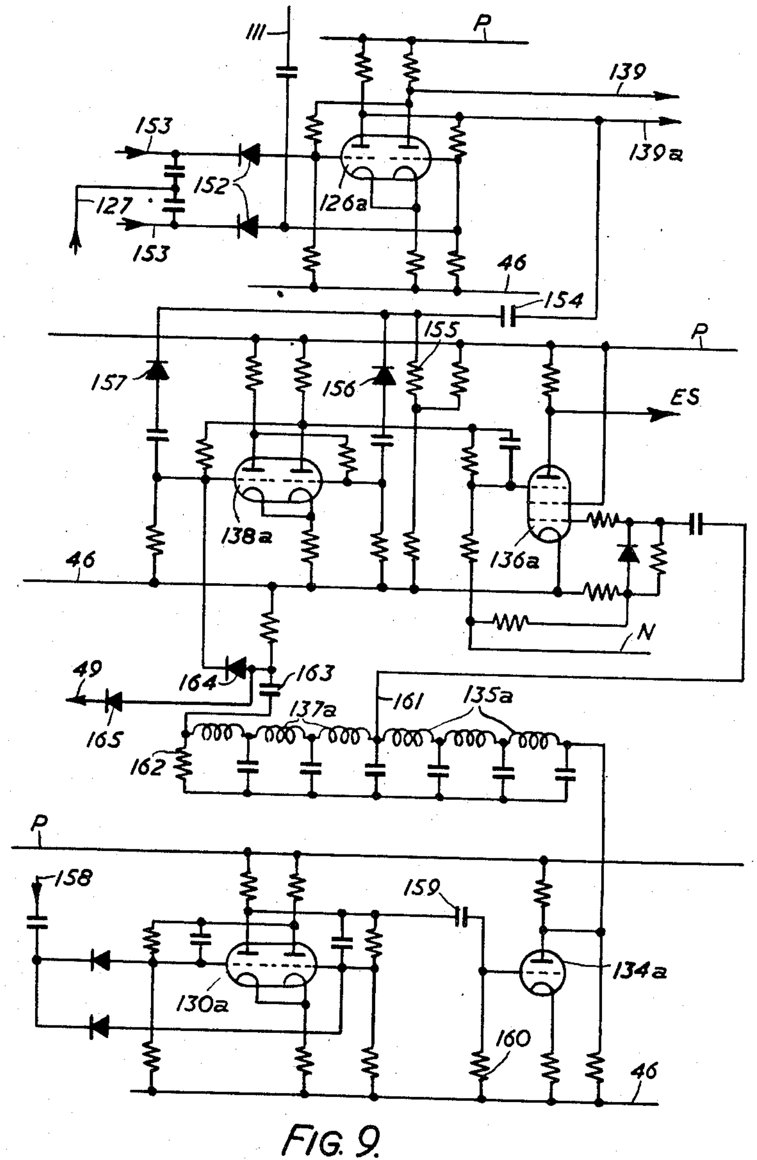

The invention will now be described, by way of example, with reference to the accompanying drawings in which, Figure 1 is a schematic diagram showing tape reading heads and reading circuits, Figure 2 shows in schematic form reading error detection circuits, Figure 3 shows idealized waveforms for the circuits of Figures 1 and 2, Figure 4 is a block diagram of the apparatus, Figure 5 is a schematic diagram of a decoder circuit, Figure 6 shows in diagrammatic form tape feeding control devices, Figure 7 shows details of the circuit of Figure 1, Figure 8 shows details of the circuit of the upper part of Figure 2, and Figure 9 shows details of the circuit of the lower part of Figure 2.

It will be assumed that a magnetic tape has had information recorded thereon in coded form by a computer, for example, and that it is desired to read the recorded information and apply it to control a utilisation device which is, in the example given, a printer.

Each character, that is, letter, numeral or symbol is represented by a particular combination of a seven element code. The character is identified by six of the seven elements, the seventh element being used for parity checking purposes. For example, the letters A and L may be represented by the groups 0100011 and 1000110, respectively. The last code position being "one" and "zero" respectively to make an odd number of "ones" in each group. Thus, by determining that there are an odd number of "ones" in each character group, the accuracy of the code may be checked.

All the elements of a character group are recorded on the tape simultaneously, each on a separate track, so that there are seven tracks. The characters are recorded in pairs of blocks, with spaces in between the block pairs, and one pair of blocks forms a record. For the purpose of the present description, a record will be used to designate all the data relating to one printed document, and includes identification data and information which is required to be printed. For example, each document may be a stock dividend warrant, and each record will contain the name and address of a stockholder, the value of the stock and the dividend payable.

In each of the block pairs comprising a record, the first block consists of the identification data which enables the record to be handled within the computer and the second block consists of the information which is to be printed. Each of the blocks is followed by a special character code, which will be referred to as the block end code. The gap between the block end core of the identification block and the beginning of the information block of each record is filled by a gap code 1111111. The tape between records is blank.

During the preparation of the tape it is passed through a check reading head position after it has been recorded. Reading heads in this position read the recorded characters in turn and each character code is checked for parity. If a character was incorrectly recorded, as indicated by the failure of the parity check, due to a fault in the tape or dust on the tape surface, for example, the recording heads record an error code and the record containing the error, is recorded again, following the error code recording.

In order to effect printing the recorded information the magnetic tape is fed through a tape reader 1 (Figure 4). The tape reader has seven reading heads 101, shown in Figure 1, which each read one of the seven tracks recorded on the tape 102. The outputs from these heads are fed to an amplifier 2 (Figure 4) which applies signals representing ones and zeros, in accordance with the character code read by the reading heads, to a character decoder 3. The amplifier 2 also generates a clock pulse on a line 4, for each character which is read. Gating arrangements associated with the signal amplifying circuits produce an error signal if any, but not all, of the reading heads produce a signal, and a parity checking circuit produces an error signal if the character code which has been read contains an even number of ones. These error signals are applied to set a read error trigger 5.

Figures 1 and 2 show schematically in greater detail the arrangements in the amplifier 2 for generating error signals as the result of incorrect reading or of the reading of an incorrectly recorded code and for providing a character code output and a clock pulse for each character read.

Each of the heads 101 operates an identical reading circuit, of which only one is shown in detail in Figure 1. The output of each head 701 drives a preamplifier 103 to produce an output waveform approximating to one cycle of a sine wave for each element read, the first half cycle being positive for a "one" and negative for a "zero." The waveform at line A (Figure 3) shows the output of the preamplifier when the head reads the signals "1," "0" and "1" in succession.

The output of the preamplifier 103 is fed to the primary winding of a transformer 104 which has a centre tapped secondary winding feeding two normally conducting amplifiers 105 and 106, which produce positive pulses corresponding respectively to the positive and negative peaks of the sine wave signals applied to the transformer. The waveforms produced by the amplifiers 105 and 106 are shown at lines B and C (Figure 3). The pulses from amplifier 105 are applied to a differentiating circuit 107 which produces from the leading edge of each pulse a trigger pulse for a monostable trigger 108. The output of the trigger 108, the waveform of which is shown at line D (Figure 3) is applied to open a gate 109 and also appears on a line 110 for a purpose to be explained in connection with Figure 2.

The gate 109 also receives the output pulses from the amplifier 106 and passes these pulses to a line 111 only if the gate has been opened by the output of the trigger 108 at a time when the pulse from the amplifier 106 arrives. This is the case when a "1" is read by the head 101. In the case when a "0" is read by head 101 the pulse from amplifier 106 arrives before the gate is opened. Line E (Figure 3) shows the output from the gate 9.

Each head has a similar reading circuit and has a line 110 and a line 111. These circuits are represented by the block 143. Thus, a signal is produced on a line 111 each time a "1" is read by the associated head 101, and a signal is produced on a line 110 whenever a "1" or a "0" is read by its associated head 101.

The lines 110 and 111 are used to control circuits shown schematically in Figure 2. Pulses generated whenever an element is sensed are passed over lines 110 and applied through cathode followers 112, one of which is associated with each line 110, to gates 113 and 114. Gate 114 is a multi-input AND gate which yields an output only when pulses appear simultaneously on all the lines 110. Thus an output from the gate 114 indicates that signals have been read by all the heads 101. The gate 114 output is applied through a cathode follower 115 and a pulse inverter 116 to close a gate 117.

Gate 113 is an OR gate and produces an output pulse whenever one or more of the lines 110 is pulsed, this output pulse being passed over a line 93 and through a cathode follower 118 to a differentiating circuit 119. The pulse from the cathode follower 118 is also delivered to the line 4 and thus provides the clock pulse generated for the sensing of each character from the tape.

The circuit 119 differentiates the leading edge of the pulse from cathode follower 118 to provide a triggering pulse for a monostable trigger 120. The time constant of this trigger is sufficiently great to prevent double triggering due to variations in phase of the various pulses on the lines 110 caused, for example, by minor misalignment of the heads 101 or by skewing of the tape.

A positive going square wave output is obtained from trigger 120 and a differentiating circuit 121 is used to differentiate the leading edge of this pulse to provide a triggering pulse to be applied to a delay trigger 122. The trailing edge of the pulse output from the trigger 122 is again differentiated by a differentiating circuit 123 and is applied to a further trigger 124. The delay introduced by this succession of triggers allows for possible phase variations in the pulses on lines 110 and ensures that the output of the trigger 124 occurs at a time when all line 110 pulses are coincident. The output of the trigger 124 is applied as a test pulse to the gate 117. If, at this time, the gate 117 has not been closed by the output from the gate 114, the test pulse is passed by the gate 117 as an error pulse to set an error trigger 5 (Figures 2 and 4). Thus this first error pulse derived from the gate 117 denotes that a signal has been read by one or more but not all the heads 101.

Waveforms at lines F, G and H of Figure 3 show the relationships between pulses derived from the lines 110 as described. Line F represents the inverted output of gate 114. Line G shows the output pulses from the trigger 122 from which the test output pulse (shown at line H) from trigger 124 is derived.

A second error pulse is applied to the error trigger 5 in the event of detection of an error by the parity checking circuit, which will now be described with reference to the lower part of Figure 2. The signals on lines 111, each representing the reading of a "1" by the associated reading head 101, are applied in parallel to the seven stages 126 of a shifting register. Shifting pulses are applied in trains of seven to the shifting register over a line 127 from a shift pulse source 144. The shifting pulses are also applied to a counter arranged to give an output upon reaching a count of seven. This counter consists of triggers 128, 129 and 130 and control gates 131 and 132. The gate 131 is closed and the gate 132 is opened when all the triggers 128, 129 and 130 are in a reset condition. Thus the first shift pulse of the train is applied to the input of the second counter stage to set the trigger 129. The switching of any trigger reverses the conditions of the gates 131 and 132, so that gate 131 is opened and gate 132 is closed. The subsequent shift pulses are then applied to the input of trigger 128, and the three triggers 128, 129 and 130 then function as a normal three-stage binary counter. Since the first pulse effectively entered a "two" the counter resets to zero and provides an output pulse after entry of a further six pulses. The resetting of the triggers at the zero condition thus returns the gates 131 and 132 to their original conditions. The output of the counter is applied through a differentiating circuit 133 and an inverter 134 to a delay element 135. The delayed output from the element 135 is then applied in parallel to a gate 136 and another delay element 137.

The first shift pulse applied to the register stages 126 has the effect of shifting the information along the register by one stage, the stage at the left-hand end of the register being reset to register a "0." This "0" setting is then propagated along the register by the subsequent shift pulses so that at the end of the shift pulse train the register is cleared in readiness for the reading of a new character. The information shifted out of the register is applied over lines 139 to the decoder 3 (Figures 2 and 4).

Each time a "1" is shifted out of the register a signal is fed through a differentiating circuit 140 to two gates 141 and 142. The gates 141 and 142 are controlled by outputs from a trigger 138 so that the gate 142 is open when the trigger 138 is in an unset state. The first "1" signal is therefore applied through the gate 142 to set the trigger 138, thus causing the gate 142 to be closed and gate 141 to be opened. The second and subsequent even signals therefore pass through gate 141 to unset the trigger 138. Hence, the trigger 138 is set for an odd number of signals and is unset for an even number. Since the parity check requires that an odd number of "1" shall have been read, the trigger 138 is required to be in its set condition at the end of a complete shifting cycle of seven shift pulses. The set output of the trigger is applied to close the gate 136 so that if an even number of signals has been applied to the trigger 138 the gate 136 will be open at the time when a pulse is delivered from the delay element 135. This pulse is therefore passed through the gate 136 and is applied as the second error pulse, indicating non-parity, to set the error trigger 5.

The pulse from the delay element 135 is further delayed by the delay element 137 and is then applied to the trigger 138 to reset it in readiness for the next cycle of operation.

Thus it will be seen that each character recorded in one of the blocks of the record is read by the sensing heads 101 in the tape reader 1 (Figure 4). Further, the signals representing a character are checked in the amplifier 2 to ensure that, whenever a signal is detected by one head, each of the remaining heads also reads a signal and the parity of the signals read is correct, failure of either of these checks causing operation of the error trigger 5. In addition, the amplifier 2 also generates a clock pulse on the line 4 whenever a character is read, and passes the information derived from reading each of the seven tracks to the decoder 3.

It will be appreciated that the clock pulses may alternatively be generated by reading an eighth track in which a pulse has been recorded corresponding to each recorded character position.

It will be assumed that initially the tape is stationary in such a position that approximately the middle of the second block of a record is beneath the reading heads of the tape reader 1. The record beneath the reading heads is the record immediately preceding that which is to be printed. This is the position assumed by the tape at the beginning of the normal cycle of printing of a record.

On completion of printing of a record by a printing mechanism 6, relay contact 22 is closed to apply a starting signal over a line 7 (Figure 4), through a relay contact gate 34, open only when the tape is at rest, to a tape drive control unit 20 to cause the tape to be driven in a forward direction. The tape drive control unit is shown diagrammatically in Figure 6.

The tape 102 is fed in a forward direction from a supply reel 52 over idler pulleys 53 and past the reading head assembly 54 to a take-up reel 55. A pressure plate assembly 56 maintains the tape in contact with the head assembly. The reels 52 and 55 are fitted with friction brakes 57. The take-up reel 55 is mounted on a shaft 58 driven through a light friction clutch 59 by a motor 60. The motor 60 is energised to drive the reel 55 whenever the tape is driven in a forward direction. Similar drive arrangements are provided from a motor 61 to drive the reel 52 whenever the tape is driven in a reverse direction. These reel drive arrangements ensure that the tape is wound upon the appropriate reel as it is fed past the sensing head assembly 54. The tape itself is driven by means of constant speed driving rollers 62 and 63 acting in co-operation with pinch rollers 64 and 65 respectively. For example, in order to drive the tape in a forward direction a forward drive solenoid FC is energized and rocks an arm 66 about a pivot 67 against the tension of a spring 68. The roller 65 is carried by the end of the arm 66 and presses the tape 51 against the driving roller 63 which is rotating at a constant speed in the direction of the arrow 69. The tape is driven in the reverse direction in a similar manner by the energization of a reverse drive solenoid RC.

The solenoids FC and RC have contacts FC*a* and RC*a* which are closed when the solenoids are de-energized. A connection from a neutral supply line 46 is taken through the contacts RC*a* and FC*a* and the coil of a relay R34 to a second supply line 70, so that the relay R34 is operated whenever the tape is at rest. The relay R34 and its associated contact R34*a* form the relay gate 34.

The starting signal on line 7 is therefore passed by contacts R34*a*, closed when the tape is stationary, contacts SP*a*, through the solenoid FC, the motor 60 and a relay ST coil in parallel to the line 70. The solenoid FC and motor 60 are energized to feed the tape in a forward direction. The relay ST operates and closes contacts STa to connect the contacts SPa directly to the line 46 and so to provide a holding circuit for the forward drive.

The movement of the tape past the reading heads causes the amplifier 2 to apply output signals to the decoder 3 in accordance with the characters read sequentially from the record.

Figure 5 shows, schematically, the decoding circuits of the decoder 3. The train of information pulses shifted out of the register stages 126 (Figure 2) are, it will be recalled, applied over the line 139 to the decoder 3, where they are again shifted into a shifting register comprising seven stages 40.

It is arranged that information representing the parity element is shifted into the extreme left-hand stage 40, and this stage, therefore, plays no part in the decoding operation. The remaining six stages each hold one of the six code elements read by the heads. Output signals from the stages are applied through cathode followers 41 to lines 42 and 43. A line 42 and a line 43 is provided for each of the six stages and these lines are connected so that the potential of a line 42 is set at a negative value if the stage with which it is associated is registering a "0." Conversely, if a stage is registering a "1" the associated line 43 assumes a negative potential.

The lines 42 and 43 comprise the vertical lines of a diode matrix, whose horizontal lines 44 are connected through individual resistors 45 to a zero potential supply line 46. Diodes, such as 47 are connected between the horizontal and vertical matrix lines and are arranged to effect the decoding of the information registered by the stages 40. For example, the uppermost horizontal line 44 shown in Figure 5 is connected by means of diodes 47 to the lines 43 of the first four stages 40 and to the lines 42 of the last two stages. Thus, since each diode is arranged to conduct if the vertical line to which it is connected is at a lower potential than the line 46, for any other setting of the register stages 40 than "000011," at least one of the diodes will be conducting, and the potential of the upper line 44 will be reduced to a negative value. It will be seen, therefore, that by connecting diodes between the vertical lines 42 and 43 and the horizontal lines 44, each line 44 is arranged to remain at the potential of the line 46 for a unique combination of code elements registered by the stages 40, all other combinations causing the potential of the line to assume a negative value.

Each line 44 is connected to control a character gate 48, each gate 48 being open if the associated line 44 remains at the potential of the line 46 and being closed if the potential of the line 44 is reduced to a negative value.

A pulse, derived from the delay element 137 (Figure 2), is applied over a line 49 (Figures 2 and 5) to the character gates 48 and is passed by that gate which remains open to one of the character lines 50. Thus, each combination of code elements is decoded by the matrix and one character line is selected and impulsed. An impulse on a line 50 is used to select the appropriate character to be printed by the printing mechanism. Two predetermined combinations of elements represent, respectively, the error code and the block end code. The lines 50 associated with the character gates 48 which are arranged to respond to these codes are connected, respectively, to the error code detector 24 and the block end detector 9 (Figures 4 and 5).

The decoding of each of the characters read from the second block of the record proceeds as described above. It will become apparent that the information recorded in this block does not control the printer on this cycle. However, when the reading heads read the block end code at the end of the second block, the decoder applies a signal to set the block end detector 9, which is a monostable trigger. The block end detector 9 in setting applies a pulse to set a bistable trigger 10 (Figure 4) acting as a binary counting stage. This counting stage has a common input and is alternately set and unset as pulses are generated by the setting of the block end detector, which resets after a predetermined time interval in readiness for the detection of the next block end code. The blank tape between records then passes the reading heads, producing no signals.

The first block of the record to be printed is then read by the tape reader. The block end code at the end of this first block causes a further signal to be applied to the block end detector 9, and so to the binary stage 10. This signal unsets the stage 10, which in unsetting, applies a signal to set a record start indicator 11, which is another bistable trigger. A multi-input AND gate 12 is controlled jointly by outputs from the record start indicator 11 and the binary stage 10, and is arranged to pass clock pulses from the line 4 at a time when the binary stage 10 is unset and the indicator 11 is set, i.e. at the end of the first block of the new record. These clock pulses are applied through a normally open gate 13 to the first stage of a counter 14. The gate 13 is closed by an output from a stage of the counter 14 so that it closes when the counter registers a predetermined total.

The clock pulses counted by the counter 14 are generated by the amplifier 2 as the result of sensing the gap code recorded in the gap between the first and second blocks of the record, and the counter reaches the predetermined total at the end of this gap. At this point then, the gate 13 is closed by the output from the counter and counting of further clock pulses is inhibited. A second output from the counter is applied to open a gate 15 which also receives clock pulses from the line 4. Clock pulses are passed by the gate 15 in synchronism with the reading of the second block of the record. These clock pulses are generated by the amplifier 2 in synchronism with the reading of the characters in the second block of the record, that is the characters which are to be printed. At the same time these characters are also being decoded by the decoder 3. Thus the clock pulses passed by the gate 15 are used to control the distribution within the printer 6 of the decoded characters. As each character is decoded a pulse is passed over the appropriate character line 50 to a buffer store consisting for example of a core storage matrix. The character lines 50 are linked with all the cores in a column, and a particular row is selected to store the decoded character by the energisation of a row line in response to the clock pulse delivered by the gate 15 and relating to the same character. This distribution is controlled by use of half-current techniques in relation to the core storage elements. The arrangements for distributing, storing and printing, the decoded character form no part of the present invention and will therefore not be described in detail. However, one such arrangement for sequentially storing information under control of a scanning device and subsequently operating a printing mechanism to record the information thus stored is described in co-pending British patent application No. 14915/57.

At the end of this second block the detection of a block end code again causes a signal to be applied to the binary stage 10, which is again set. A resulting output signal from the stage 10 is applied to a gate 18. The gate 18 is controlled by an output from the record start indicator in its set state and is therefore open at this time. Hence, the signal is passed by the gate 18 and is applied to a normally open gate 19 from which it is in turn passed as a "normal reverse" signal over a line 21 to the tape drive control unit 20. The signal from the gate 18 is also applied to reset the counter 14 over a line 25.

The signal on the line 21 is passed through an inverter 71 (Figure 6) and an amplifier stage 72 and is then applied over a line 73 through the coil of a normal reverse control relay NR to the line 70. The relay NR operates and closes contacts NRa. These contacts provide a hold circuit for the relay NR and also provide a path through thermal delay contacts 74, contacts FC*b* of the solenoid FC now transferred, to the coil of a stop control relay SP and thence to the line 70, thus operating the relay SP. Contacts SP*a* of the relay SP in the forward drive control circuit open and disconnect the forward tape drive circuit, by de-energizing the solenoid FC and the motor 60. De-energization of the solenoid FC causes the contacts FC*b* to transfer to the position shown so that the path from the contacts 74 is now extended to the solenoid RC and the motor 61 to drive the tape in the reverse direction. After a predetermined time interval the thermal delay contacts 74 open and disconnect the tape driving circuit. The time taken for the operation of contacts 74 is arranged so that the tape is brought to rest in such a position that approximately the middle of the second block of the record which has just been read is lying beneath the sensing heads 101 of the tape reader. This is the starting position of the tape for reading the next following record. During this reverse drive the block end code at the end of the second block is again read and a resulting signal from the block end detector 9 (Figure 4) causes the binary stage 10 to be unset. The unsetting of this stage causes a signal to be applied to unset the record start indicator 11.

It will be appreciated that during a normal reading cycle four block end codes are sensed. In order to avoid providing a special starting condition of the circuit, it is desirable that the first record on the tape should be preceded by a block end code, so that the correct count of block end codes is obtained.

The information contained in the second block of a record has now been read from the tape into the buffer store of the printer 6 (Figure 4). The printing mechanism of the printer 6 is a cyclically operated continuously-running device which is not synchronised to the tape driving mechanism. Instead, the contents of the buffer store are read by a scanning device driven synchronously with the printing mechanism. This scanning device is brought into operation by a starting impulse from the printing mechanism at the bginning of a printing cycle. The counter reset line 25 is extended to the printer and the signal on this line is used to allow the starting impulse from the printing mechanism to be effective to start the scanning operation. Thus an operation of the scanning device is initiated on the first printing cycle after the second block of the record has been read. Output signals representing the characters stored in the buffer store are further controlled by an inhibiting unit in the printer, the inhibiting unit being ineffective during a normal printing cycle, and pass to the printing mechanism to cause the printing of the corresponding characters. At the end of a printing cycle the printing mechanism again operates the relay contacts 22 to provide a signal over the line 7 to start the forward drive of the tape reader to read a new record. The reading, decoding and printing of each record in succession follows as has been described, provided that the information in the second block of each record has been correctly recorded on the tape and has been correctly read by the tape reader. It will be recalled that an error signal is applied to the read error indicator 5 (Figure 4) if the information contains an incorrectly recorded code, or if a correctly recorded code is incorrectly read. The case of an incorrectly recorded code is detected during the initial preparation of the tape and an error code is recorded on the tape, followed by another recording of the incorrect record. Thus, if an error is indicated by the setting of the error indicator 5 it is necessary that the forward movement of the tape be continued for a predetermined time so that the tape is scanned for the presence of an error code. If the error code is detected by the decoder 3 an impulse is applied to set an error code detector 24. This indicates that the error was made during recording and a correct entry has been made on the tape following the error code. For this reason the reading controls must be reset, and the forward movement of the tape continued so that the correct recording may be read. If, on the other hand, an error code is not detected the error must have been made during reading of the tape, and the tape is then driven in reverse to the previous starting point and the reading operation is repeated.

When the error indicator 5 is set, a signal is applied through an OR gate 26 to close the gate 19 and prevent the passage of the normal reverse signal to the reverse drive control 20. The tape drive then continues in a forward direction. The signal from the gate 26 is also passed to the printer 6, where it causes operation of the inhibiting unit to prevent the operation of the printing mechanism.

The signal from the error indicator 5 is also applied to a gate 27 which is opened by a signal from the gate 18 occurring at the time when the block end code at the end of the second block of the record is sensed. Hence, the signal is passed by the gate 27 at a constant point in the reading cycle, although the error signal may be generated by the error indicator 5 at any time during the reading of the record. The signal is delayed for a predetermined time by a delay unit 28 and is applied to two gates 29 and 30. The delay thus introduced is sufficient to allow the error code detector 24 to be set if an error code has been recorded on the tape. The operation of the error code detector is such that if an error code has been detected the gate 29 is opened and the gate 30 is closed. If no error code has been read the gate 29 remains closed and the gate 30 remains open.

Thus, if no error code has been detected the delayed signal from the gate 27 is passed by the gate 30 over an "error reversing" line 31 to the tape drive control unit 20. The signal over this line is applied through inverter 75 and amplifier 76 to operate an error reversing relay ER. This relay operates a thermal delay element 77 and effects stopping of the forward drive, engaging of the reverse drive and stopping of the tape in a similar manner to that described for the normal reversing operation, but in this case the reverse drive is engaged by the action of the element 77 for a time sufficient to move the tape back to the point at which it rested before the reading cycle was begun. During this reversal three block end signals are detected; respectively those following and preceding the second block the current record and that at the end of the second block of the previous record. Hence, when the tape is brought to rest the binary counting stage 10 will be unset but the record start indicator 11 will be set. The pulse from the gate 30 is passed through an OR gate 23 and a delay unit 32 to a resetting line 33, from which it is applied as a resetting pulse to unset the record start detector 11 and the error indicator 5. The delay introduced by the delay unit 32 is sufficient to ensure that the record start detector 11 is unset after the three block end codes have been detected and this leaves the reading circuits prepared in readiness for a second reading cycle of the same record. The resetting pulse from line 33 is also applied to the error code detector 24, but as this has not been set the pulse is ineffective.

At this point the buffer store in the printer 6 contains the result of the reading cycle which is in error, and before a new reading cycle can take place the store must be cleared. Since the printing mechanism is continuously running it initiates an operation of the storage read-out scanning device and the signals representative of the stored information are read out of the store. However, since in the present example the printer inhibiting unit has been made effective the signals now read out of store are prevented from passing to the printing mechanism, and no printing takes place. At the end of this ineffective printing cycle the printing mechanism passes the normal signal from contacts 22 over the line 7 to cause the tape reader to begin a new reading cycle.

During the time when the tape is driven in reverse the printer will have completed one or more ineffective cycles and consequently, since the tape reader and printing mechanism are asynchronous, one or more starting signals will have been passed on to line 7. The purpose of the gate 34 is to prevent these signals from initiating a reading cycle, the gate 34, consisting of the relay R34 and its contacts (Figure 6), being arranged, as described, so that a pulse on line 7 is allowed to pass only when the tape driving mechanism is stationary.

The operation of the error circuits when an error code is detected differs from that described above. In this case the gate 30 is closed and the gate 29 is open. The signal from the delay unit 28 is now passed through the gate 29 and then through the OR gate 23 and the delay unit 32 to the resetting line 33 without causing the tape drive to reverse. The resetting pulse on the line 33 then unsets the error indicator 5 the error code detector 24 and the record start indicator 11. At this point the binary counting stage 10 is set, the record start indicator 11 is unset, and the tape is being driven in a forward direction. The second recording of the record then passes the reading heads 101 and at the end of the first block of the record a block end code is detected. This causes the binary stage 10 to be unset, and in unsetting this stage applies a signal to set the record start indicator 11 so that the second block of the record is read in the normal way. During the forward motion of the tape the buffer store in the printer 6 is cleared by an ineffective printing cycle as described above.

Although the error checking circuits described above are arranged to detect in recording or reading the information they are not adapted to operate if the tape reading heads fail to read one or more characters. However, in this case fewer clock pulses are passed to line 4 from the amplifier 2 than is normal. The characters which have been read are passed to the buffer store in the printer 6 by the decoder 3 in the usual way. At the end of the second block an indication that the store is not full, is supplied by the character distributing device associated with the store. Under these circumstances the tape reader is required to reverse the tape to approximately the middle of the second block of the previous record and perform another reading operation.

A line 35 from the character distributing device in the printer 6 carries a signal during the time when the distributing device is operating to distribute information in the buffer store. This signal is removed when the distributing operation is complete and its removal, therefore, serves to indicate that the store is full, that is, all characters have been read, decoded, and stored. The signal is applied to the OR gate 26 and also to gate 36. From the OR gate 26 the signal is passed to hold the gate 19 closed to prevent the normal reversal of the tape drive. It is also applied to the inhibiting unit of the printer 6 to prevent a printing operation. If the tape has been correctly read the signal on line 35 is removed as the last character is entered into the store so that the normal operation of the reversing and printing circuits is not impeded. If, however, the store is not filled the signal remains effective, and the gate 36 is conditioned to pass a signal derived from the output of the gate 18 at the time when the block end code is detected at the end of the second block of the record. The signal from the gate 18 is passed through a delay unit 37 to allow sufficient time for the stabilisation of the signal generating circuits in the distributing device of the printer. The output from the gate 36 is used to cause a reversal of the tape drive in the usual manner by way of a line 38 connecting the gate to the tape control unit 20. The application of a signal over line 38 (Figure 6) causes reversal of the tape drive in a manner similar to that previously described, the duration of the reverse drive being determined by thermal delay contacts 78 in conjunction with relay RR so that the tape is brought to rest in a suitable position to allow a further reading of the same block. The output of the gate 36 (Figure 4) is also applied through an inverter 16 and the delay unit 32 to the resetting line 33 to effect resetting of the record start indicator 11. The buffer store in the printer 6 is cleared, in the usual way, by an ineffective printing cycle.

In certain circumstances information may be recorded on the tape in the form of groups of records, a group containing a number of records and two adjacent records being spaced apart by a predetermined interval. The space between the last record of one group and the first record of the succeeding group may be considerably greater than this interval. Under these circumstances the time lapse between reading the last record of one group and the first record of the following group may be reduced by continuing to drive the tape for a predetermined time in a forward direction, instead of reversing its direction at the end of the last record of a group. This forward drive is terminated just before the first record of a new group reaches the reading heads. This forward drive may conveniently be controlled by the recording of a special character, known as the track-end code, immediately following the block end code at the end of the last record of a group. The decoding of the track-end code may be used to operate a track-end detector in a similar manner to the operation of the error code detector.

It will be recalled that in normal operation the detection of the end of a block causes the tape drive to stop and then reverse. If a track-end code is detected, the reversal of the tape drive is suppressed, and the forward drive is re-engaged for a predetermined time. A timing circuit for this purpose, similar to that used in the reverse drive control, is provided in the forward drive control. During the forward drive of the tape the record start indicator 11 is reset in a similar manner to that in which it is reset under the error code detection condition.

Circuit details of the various schematic blocks referred to in the foregoing description will now be given.

Figure 7 shows circuit details of the tape reading circuit of Figure 1. The preamplifier 103 consists of two conventional capacity-coupled amplifying stages 81 and 82 followed by a cathode follower stage 83. Each reading head 101 is connected to the primary winding of a transformer 84, the secondary winding of which is connected between the zero potential supply line 46 and the control grid of the first pentode amplifying stage 81. The cathode of the cathode follower stage 83 is connected through a resistor 85 to a negative supply line N, and the output is taken from the cathode by means of the transformer 104, the primary of which is connected between the cathode follower cathode and the line 46.

The secondary winding of the transformer is centre tapped, the centre point being connected to a potential divider formed by resistors 87 and 88 between the line 46 and a positive supply line P.

The amplifiers 105 and 106 include respectively the two halves **105*a* and 106*a* of a double triode, each end of the secondary winding of the transformer 104** being connected to the control grid of one of the halves.

The amplifier sections **105*a* and 106*a*** are arranged to be normally conducting, outputs from the anodes in the form of positive going pulses being derived when negative signals of greater amplitude than the bias potential of the centre tap of the transformer are applied by means of the secondary winding.

The differentiator 107, consisting of a capacitor 86 connected to the anode of the triode section 105 and a resistor 86 with an intermediate diode 90 is connected between the amplifier section **105*a* and the control grid of a double triode 108*a*** arranged as the monostable trigger 108. The diode 90 ensures that only the positive-going differentiated pulse is applied to the left-hand control grid of the trigger 108a. Application of this pulse causes the trigger to switch to its unstable state i.e. the left hand triode section conducts and a negative pulse is delivered to the right-hand grid by a capacitive connection. After a delay depending on the time constant of this anode-grid coupling the trigger 108 restores. Thus a positive-going square waveform output of predetermined duration is available at the anode of the right hand triode section, and the line 110 is connected to this anode. This pulse is also passed by a capacity coupling to the suppressor grid of a pentode 109a which forms the gate 109. The output from the anode of the amplifier section 106a is applied to the control grid of the pentode 109a, and an output is obtained on line 111 at the anode of this pentode when signals on the control and suppressor grids coincide i.e. when a "1" is read by the reading head 101.

Figures 8 and 9 show circuit details of the apparatus described with reference to Figure 2. It will be recalled that each line 110 is connected to a cathode follower 112. These cathode followers are shown in Figure 8 and each consists of a half-section of a double triode 112a. The lines 110 are connected to the control grids of the triode sections, whose anodes are connected to the supply line P. The cathodes of the triode sections are each connected through a resistor 91 to the other supply line N. Outputs are obtained from the cathodes of the triode sections and are applied to the gates 113 and 114.

The gate 113 consists of diodes 92, each of which is connected between the cathode of one of the cathode followers 112 and a common line 93. The line 93 is connected to the control grid of the cathode follower 118, consisting of a single triode section 118a as in the case of the cathode followers 112. Thus, a signal on any output line from one of the cathode followers 112 causes a signal to be delivered on the output line of the cathode follower 118, the connections of the diodes and the biassing of the grid of the triode section 118 being such that this signal is positive with respect to the neutral line 46. The clock pulse line 4 is connected to this output.

The output pulse from the cathode follower 118 is applied to the differentiator 119, comprising a capacitor 94 and a resistor 95 and the differentiated signal is then applied to a pentode 96 which is arranged as monostable trigger, corresponding to the trigger 120. The pentode 96 is connected as a Miller integrator having a triggering action provided by the transitron coupling between screen and suppressor grids. Normally the suppressor grid potential is such that no anode current flows, but current flows in the screen grid circuit. The positive signal is applied to the suppressor grid by the integrator and allows anode current to flow, the potential of the anode being reduced in consequence. A capacitor 97 is connected between the anode and the control grid so that the potential of this grid falls in sympathy with the anode and a linear anode run-down takes place. As anode current flows the screen current is reduced, with the result that the potential of the suppressor grid is held above cut off. As the anode run-down progresses a point is reached when the anode potential is too low to maintain the required rate of increase of anode current and the screen current then increases. The potential of the screen grid then falls and with it the potential of the suppressor grid, which in turn, tends to increase the screen current, thereby causing a regenerative cut-off of the anode current. The anode potential therefore restores to its original value as the capacitor 97 charges and the pentode returns to its original stable state. A resultant positive output pulse is derived from the screen grid of the pentode and is differentiated by the differentiator 121 comprising capacitor 98 and resistor 99 before being applied to the delay trigger 122.

This trigger comprises a double triode 122a arranged in a conventional monostable trigger circuit in the same way as the trigger 108 (Figures 1 and 7) and the triggering action produces a positive-going pulse at the anode of the right-hand triode section. However, in this case the negative going trailing edge of the output pulse is used to operate the following circuits, thus introducing a delay equivalent to the restoring time of the trigger.

This output is differentiated by a further differentiating circuit 123 consisting of capacitor 146 and resistor 147 (Figure 8) and the differentiated negative-going trailing edge of the output pulse is applied to the control grid of the left-hand triode section of a double triode 124a arranged, as in the previous cases, in a monostable trigger circuit corresponding to the trigger 124 of Figure 2.

A positive-going output pulse is derived from the left-hand anode of the double triode 124a and this pulse is applied through resistors 148 and 149 as the test pulse to the control grid of a pentode 117a, forming the gate 117. This gate is conditioned by a signal originated in the following way if signals from the reading heads are present on all the lines 110 simultaneously.

An additional connection is made, from the cathode of each of the triode sections 112a to a diode 150 and a second connection from each diode is provided through a common resistor 151 to the positive supply line P. These diodes constitute the AND gate 114. Thus, if any of the triode sections 112a is not conducting, i.e. if one or more of the lines 110 is not carrying a signal, the flow of current through the diode associated therewith lowers the potential at the common connection of the diodes and the resistor 151. This point is connected to the control grid of a triode half section 115a, corresponding to the cathode follower 115. The grid of each of the cathode followers 112a is either at approximately zero volts or +70 volts, depending upon whether the associated trigger 108 is unset or is set. Hence, if any of the triggers 108 is not set, the cathode of the associated cathode follower is also at approximately zero volts and the cathode of the cathode follower 115a is also at this voltage. The cathode of the triode 115a is connected to the grid of a triode section 116a, which corresponds to the inverter 116 (Figure 2). The cathode of the triode 116a is positively biased, so that this triode is non-conducting, as long as the grid is at zero volts, and the anode is at the potential of line P. The anode is connected to the suppressor grid of the pentode 117a. If a pulse is applied to the control grid, as described above, the pentode 117a will conduct and a negative pulse will be fed to the error trigger 5 over line ES. If all the cathodes of the triodes 112a are at +70 volts, indicating that all tracks have read, the cathode of triode 115a will be allowed to rise correspondingly. This raises the grid voltage of triode 116a and causes it to conduct heavily. The anode voltage of triode 116a is reduced and the suppressor grid of pentode 117a is taken below cut, so that no error pulse is produced on the line ES in response to the pulse on the control grid of the pentode. Thus the pentode is conditioned to pass the test pulse applied to its control grid only if one or more of the lines 110 is not carrying a signal. The output from the pentode 117a is in the form of a negative going pulse delivered over the line ES. This pulse is the first error pulse referred to earlier. A second error pulse is derived from the parity checking circuit which will now be described with reference to Figure 9 taken in conjunction with Figure 2.

It will be recalled that negative-going pulses are applied to those lines 111 associated with reading heads which have read a "1." Each line 111 is connected to a stage 126 of a shifting register. The stages 126 are similar and the last or output stage is shown in Figure 9, having a double triode 126a connected as a bistable trigger. Each trigger is initially reset to register a "0" and in this condition the right-hand triode section is conducting. The associated line 111 is capacitively coupled to the control grid of this section, so that a pulse on the line 111 sets the trigger to its opposite state to register a "1."

Negative-going shifting pulses are delivered to all stages in parallel over the line 127, which is capacitively coupled through diodes 152 to the control grids of both sections of all stages except the first. In the case of the first stage the line 127 is capacitively coupled to the control grid of the left-hand section only, so that this stage is arranged to register zero throughout the shifting operation. In the remaining stages each diode 152 is further conditioned by a connection 153 from the opposite anode of the preceding stage, so that a negative shifting pulse is effective to set a trigger to the condition registered by the preceding stage.

In this way the contents of the register stages are shifted along the stages and consequently the last stage **126*a*** (Figure 9) registers, in turn, the settings of each of the other stages. At the same time, the "0" setting of the first stage is similarly propagated along the stages so that, at the end of the shitfing cycle all stages are again reset to the initial "0" condition.

A negative-going output pulse is derived from the left-hand anode of the final stage **126*a* each time this stage registers a "1," and these pulses are passed to the parity checking circuit. At the same time the settings of the register stages 126 are shifted into the stages 40 of the decoder (Figure 5) which are similar to the stages 126*a*. Shift pulses from the line 127 are applied to all the stages 40, and lines 139 and 139*a* are extended from the anodes of the last register stage 126*a* to condition the control grids of the first of the stages 40. Thus, at the end of a shifting cycle the stages 40 of the decoder contain the information that was originally entered into the register stages 126**.

The output pulses from the left-hand anode of the double triode **126*a* (Figure 9) are differentiated by capacitor 154 and resistor 155, corresponding to the differentiating element 140 of Figure 2, and are applied to two diodes 156 and 157. These diodes correspond to the gates 141 and 142 and are arranged to pass only the differentiated leading edge of each pulse, and their anodes are respectively capacitively coupled to the control grids of a double triode 138*a* which is arranged in a bistable trigger circuit corresponding to the trigger 138. Initially the left-hand triode section of 138*a* is conducting and the first output pulse from the register stage 126*a* is effective only through the diode 157 to switch the trigger 138 to its opposite stable state. Similarly the second pulse is effective through the diode 156** to reset the trigger.

The anode of the right-hand section of the double triode **138*a* is coupled to the suppressor grid of a pentode 136*a*, corresponding to the gate 136, so that the potential of this grid is raised to condition the pentode whenever the trigger 138** is reset i.e. whenever an even number of pulses have been applied to the trigger.

It will be recalled that shift pulses on the line 127 are applied through gates 131 and 132 to a three-stage counter consisting of triggers 128, 129 and 130. The last counting stage is shown in Figure 9 and consists of a double triode **130*a* arranged as a bistable trigger. The stages 128 and 129 are similar. The input to each stage is applied over a simple line, such as 158, the line being connected to the left-hand anode of the previous stage, the left-hand sections of all the stages being conductive when the counter registers zero. Thus a negative going pulse is passed to the following stage whenever a stage is reset. The input line to the second stage is also connected to the output of the gate 132, isolating diodes being provided in each path to the input. The left-hand anodes of all the stages are also connected through isolating diodes to the suppressor grid of a pentode, similar to 136*a*, which forms the gate 131 so that this gate is conditioned to pass the counting pulses whenever any stage is set. The gate 132 includes a pentode whose control grid is conditioned by a triode section which is in turn conditioned by outputs derived from the right hand anodes of all the counting stages through isolating diodes. Hence, this triode section is cut off if the counting stages are all reset, and a signal from the anode of the triode section is then applied to condition the suppressor grid of the pentode of the gate 132, so that this gate is open only when the counter stages are reset. The shift pulses from the line 127 are applied through an invertor similar to the triode section 116*a* to the control grids of the pentodes in the gates 131 and 132 and the outputs from these gates are then applied to the counting stages with the result that the counter is modified to count in scale of seven. The application of the seventh shift pulse to the counter therefore causes a negative pulse to be applied over the line 158 and resets the trigger 130 so that the left-hand section of the double triode 130*a* conducts. The differentiator 33, consisting of a capacitance 159 and resistor 160, is connected to the anode of this triode section and a resultant negative going pulse is applied to the control grid of a triode 134*a*, which forms the inverter 134. A positive-going pulse from the anode of triode 134*a* is applied to a conventional delay line which is divided into two sections, the right-hand section 135*a* corresponding to delay element 135 and the left-hand section 137*a* corresponding to delay element 137. The delayed signal appearing at the tapping 161 between these sections is applied to the control grid of the pentode 136*a*, the suppressor grid of which has been conditioned as described if an even number of pulses each representing 1 have been derived from the last register stage 126. Under these circumstances a negative-going output signal, the second error signal, is derived from the anode of the pentode 136*a*** and is applied over the line ES.

Error signals on the line ES are applied to set the error trigger 5, which is a double triode arranged in a bistable trigger circuit similar to the trigger 138.

A pulse is derived from the terminal impedance 162 of the delay line section **137*a* and is applied through a capacitor 163 and an isolating diode 164 to reset the trigger 138 in readiness for the next shifting cycle. The pulse is also passed through diode 165 over line 49 (Figures 2, 5 and 9) to the decoder character gates 48**.

The delay introduced by the delay line section **137*a* is sufficient to allow the stages 40 (Figure 5) of the decoder 3 to stabilize and select the appropriate character gates 48 before the character gates 48 are opened by the pulse delivered over the line 49**.

It will be recalled that the left-hand triode sections of the stages 40 is conducting when the stage registers a "1." The left-hand anode of each stage is therefore connected to the cathode follower 41, which is a triode section arranged in a circuit similar to the cathode followers 112, and the line 43 associated with that stage is connected to the cathode of this triode section. Similar arrangements exist for the connection of the lines 42 to the right hand anodes of the stages 40.

The character gates 48 are pentodes arranged in circuits similar to that used for the gate 109, and the horizontal lines 44 are connected to the suppressor grids, so that only the gate corresponding to the selected character is conditioned to conduct when the control grids of all the pentodes are impulsed by the positive-going pulse applied to the line 49. A resultant negative-going pulse is delivered to the appropriate line 50.

The block-end detector 9 is a monostable trigger similar to the trigger 124 which is set to its unstable state by the pulse on the appropriate line 50, while the error code detector 24 is a bistable trigger of conventional kind similar to the trigger 138.

It will be appreciated that since the signals to be decoded are shifted into the stages 40 on each reading cycle these stages are not reset. Instead, the shifting-in of new information from the shifting register stages 126 causes the previous settings to be lost.

The remaining apparatus described with reference to Figure 4 also comprises circuit elements similar to those of the foregoing circuit description.

For example the binary counting stage 10 is a double triode arranged as a counting trigger similar to the double triode 130*a* of Figure 9. A negative-going output pulse is derived from the anode of the right-hand triode section of the block end detector trigger 9 each time this trigger is set in response to the detection of a block end signal. This pulse is applied to both control grids of the trigger 10 and the trigger 10 is therefore alternately set and unset as successive block end signals are detected.

The record start indicator 11 is a similar bistable trigger and its input pulse is derived from the anode of the triode section of the stage 10 which is conducting when the stage 10 is in an unset state. Thus the indicator 11 is alternately set and unset each time the stage 10 is unset.

The gate 12 is similar to the gate 132 and consists of a pentode, the suppressor grid of which is controlled from the anode of a triode. The control grid of the triode is coupled through isolating diodes to outputs derived from the triggers 10 and 11 so that the triode is cut off when the trigger 10 is unset and the trigger 11 is set. Under these conditions, therefore the pentode is conditioned to conduct upon the application of a positive going clock pulse from line 4 applied to its control grid. Since the output from the gate 12 is required to produce a positive pulse to be applied to the gate 13, the pulse ocurring at the anode of the pentode is applied to an invertor consisting of a triode arranged in a circuit similar to that for the inverter 134, and the output pulse from the gate 12 is derived from the anode of this triode.

The gate 13 is a pentode arranged as for the gate 109, the pulse from gate 12 being applied to the central grid while the conditioning potential from the counter 14 is applied to the suppressor grid.

The counter 14 consists of trigger stages similar to the stages similar to the counter stage 130, and outputs are derived from the appropriate stages to provide the negative signal to close the gate 13 and the positive signal to open the gate 15, which is another pentode gate similar to the gate 109.

The gate 18 consists of a pentode, arranged in a circuit similar to pentode 109*a*, the output of which is fed to an invertor stage arranged in a similar circuit to the triode 116. Thus positive signals applied from the stages 10 and 11 respectively to the suppressor and control grids of the pentode give rise to a positive output from the anode of the triode.

The gate 27 is similar to the gate 18, the suppressor grid of the pentode in this case being conditioned by a positive output pulse from the gate 18 so that a positive input signal derived from the unset anode of the error trigger 5 gives rise to a corresponding output signal. The output from the error trigger 5 is also applied to the OR gate 26 which consists of a triode arranged in a similar manner to the triode 134*a*, positive-going inputs being fed through isolating diodes to the control grid from the error trigger 5 and also over the line 35 from the printing device 6. The resultant output from the anode of this triode is a negative going pulse, and this pulse is fed to the gate 19.

The gate 19 is a pentode arranged as in the case of the gate 109, and the pulse from the gate 26 thus prevents the pentode conducting in response to a positive pulse applied to the control grid from the gate 18.

The two gates 29 and 30 are also pentodes arranged in similar circuits to the gate 19, the suppressor grids being respectively connected to the anodes of the triode sections of the error code detector trigger 24, so that the gate 29 is conditioned only if the trigger 24 is in its set state while the gate 30 is similarly conditioned if the trigger 24 is unset. The delayed positive pulse from the gate 27 is applied to the control grids of both pentodes and a negative output pulse is obtained from the anode of only one, in dependence upon the state of the trigger 24.

This output pulse is applied to the OR gate 23, which is another triode similar to the triode 83 and is arranged to be normally conducting. The usual isolating diodes are provided between the outputs of the gates 29 and 30 and the control grid of the trioode. A resultant output from the anode of the triode is in the form of a positive-going pulse. This output is then delayed and applied to the reset line 33 to reset the triggers 5, 11 and 24. Since this resetting pulse is positive it is applied to the control grids of those triode sections in the triggers which are conducting when the triggers are unset.

It will be recalled that the positive pulse on the line 35 is also applied to the gate 36. This gate is a pentode arranged as in the case of the gate 109, and the pulse from line 35 is applied to the control grid. The pentode is conditioned by the delayed positive output from the gate 18 applied to the suppressor grid. The output from the gate 36 is a negative-going pulse derived from the anode of the pentode. This output is passed to the tape control unit over line 38, and is also passed through an invertor 16 consisting of a triode arranged in a similar circuit to the triode 134*a*, and thence to the delay element 32 and the reset line 33.

The delay element 32 as well as the elements 28 and 37 are similar to the elements 135 and 137.

The signals passed over lines 21, 31 and 38 (Figures 4 and 6) to the tape control unit all take the form of negative pulses. Each signal is passed through an inverter such as 71, which consists of a triode arranged in a similar manner to the inverter 134 and the positive-going output of the triode is then applied to the control grid of a pentode amplifying stage such as 72. This pentode is arranged in a similar circuit to the pentode 81 and the tape control relay such as the relay NR is connected in the anode circuit of the pentode.

The circuit arrangement of the shifting pulse source 144 (Figure 2) does not form part of the present invention since its function is merely to provide trains of seven shift pulses, and hence it will not be described in detail. A suitable form of pulse source may, however, consist of a conventional pulse generator e.g. a multivibrator, which is either continuously running and has its output gated into the necessary trains of seven pulses, or is starrted and stopped at appropriate intervals. Control signals for either gating the output or for starting and stopping the generator may conveniently be derived from the output of the AND gate 114 and the output of the counting stage 130 respectively.

The code used for recording information on the tape has been described as a seven-element code, one element being used for parity checking purposes. It will be obvious, however, that other codes may alternatively be used.

Furthermore, in the event of an error in reading information from the tape, the block in which the error occurs is re-read. If the reading error is repeated, for example, because the tape has been damaged after the recording has been made, this re-reading cycle will be repeated. It will be appreciated that warning devices may be used to indicate the repeated re-reading of a tape block. For example the pulse delivered by the error trigger may also be applied to a warning circuit to light a lamp or sound an audible alarm. Repeated flashing of this lamp or sounding of the alarm will then call an operator's attention to the existence of a persistent reading error. Alternatively the error signal may be applied to a counting chain consisting of stages similar to the stages 128, 129 so that after a predetermined number of repeated readings an output from the counter may be applied to the warning device. The warning device and the counting stages would then be reset by a pulse derived, for example, from the line 21 when the block is correctly read.

It will be apparent that the identification block is not used to control printing and that it could be omitted, the information block being preceded and followed, as already described, by block end codes. This allows the information blocks to be recorded closer together on the tape, the time delays in the tape control unit 20 being adjusted accordingly. Equally, each record may comprise more than two blocks, the block end code counter being modified to have a correspondingly larger counting capacity.

The magnetic reading heads 101 may be replaced by photoelectric cells or sensing brushes to enable the apparatus to handle tape on which the data is recorded by marks or holes, instead of magnetically recorded signals.

I claim:

1. Apparatus for transferring data from a data bearing tape on which it is recorded, to a utilisation device, the data being recorded on the tape in discrete information blocks spaced apart along the length of the tape, each block being preceded and followed by a recording of marker code signals and an incorrectly recorded block being followed in addition by a recording of an error code signal, the apparatus comprising sensing means for deriving electrical signals representing the signals recorded on the tape, means for feeding the tape in a forward and a reverse direction past the sensing means and including control means for controlling the operation of said feeding means, signal transfer means coupling the tape sensing means and the utilisation device, means for applying an initiating signal from the utilisation device to the tape feed control means to initiate feeding in the forward direction, first control means responsive to the sensing of the marker code signal following an information block for applying a first control signal to the tape feed control means to stop feeding of the tape, second control means responsive to the detection of an error in the sensed signals for generating a second control signal, means for applying said second control signal when generated, to prevent the application of said first control signal to the tape feed control means, means for applying said second control signal to the tape feed control means to initiate feeding of the tape in the reverse direction after the position for recording an error code signal following said block has passed the sensing means, third control means responsive to the sensing of an error code signal for generating a third control signal and means for applying said third control signal when generated to prevent the application of said second control signal to the tape feed control means.

2. Apparatus according to claim 1 in which the tape has a plurality of parallel signal recording tracks and said second control means includes error detecting means having first means operable in response to the sensing of a signal in any one of said tracks, second means operable in response to the substantially simultaneous sensing of signals in all of said tracks and means operable to generate a first error signal in response to operation of said first means without concurrent operation of said second means.

3. Apparatus according to claim 2 in which characters are represented on the tape by binary coded signal combinations, all such signal combinations containing an odd number of binary ones, and in which said second control means further includes means for checking the parity of each signal combination which is sensed and for generating a second error signal on failure of parity.

4. Apparatus according to claim 3 in which said second control means further includes a bi-stable trigger circuit, means for applying both the first and second error signals to control the setting of said trigger circuit and means for deriving said second control signal from said trigger circuit in dependence upon its setting.

5. Apparatus according to claim 1 in which the utilisation device is a cyclically operating device and includes means for generating an initiating signal once in each cycle.

6. Apparatus according to claim 5 in which the tape feed control means includes gating means controlled to be open only when the tape is still and said initiating signals are fed first to said gating means which prevents them initiating feeding of the tape unless the tape is still.

7. Apparatus according to claim 6 which further includes means for feeding said first control signal to said utilisation device to render the utilisation device effective during its next succeeding cycle of operation.

8. Apparatus according to claim 1 in which the tape feeding means includes first and second continuously operating tape driving means adapted to feed the tape in the forward and reverse directions respectively and said tape feed control means includes means for selectively engaging the tape with the driving means.

9. Apparatus according to claim 8 in which each tape driving means comprising a continuously rotating driving roller, a pressure roller and an electro-magnet, the tape passing between said rollers and the electro-magnet having an armature mechanically coupled to the pressure roller and adapted on energisation of the electro-magnet to move the pressure roller, to press the tape against the driving roller.

10. Apparatus according to claim 1 which further includes a first gating means which is normally open, means for applying said first control signal to the tape feed control means through said first gating means and means for applying said second control signal when generated to close said first gating means.

11. Apparatus according to claim 10 which further includes a second gating means, means for applying said first control signal to open said second gating means, and means for applying said second control signal to be passed by said second gating means to the tape feed control means.

12. Apparatus according to claim 11 which further includes a third gating means which is normally open and is coupled between said second gating means and the tape feed control means and means for applying said third control signal to close said third gating means.

13. Apparatus for printing data sensed from a data bearing tape on which it is recorded, the data being recorded on the tape in discrete information blocks spaced apart along the length of the tape, each block being preceded and followed by a recording of marker code signals and an incorrectly recorded block being followed in addition by a recording of an error code signal, the apparatus comprising sensing means for deriving electrical signals representing the signals recorded on the tape, means for feeding the tape in a forward and a reverse direction past the sensing means and including control means for controlling the operation of said feeding means, a continuously running cyclically operating printing device including a signal store, a printing mechanism, means responsive to the receipt of an actuating signal for scanning said store in the cycle of operation immediately following receipt of said actuating signal to read out signals stored therein, means for feeding said signals to the printing mechanism and means for generating an initiating signal at the commencement of each said cycle, signal transfer means coupling the tape sensing means and the input to said store to transfer signals sensed from the tape to the store in a predetermined order, means for feeding said initiating signals from the printing device to the tape feed control means, means within the tape feed control means responsive to an initiating signal only when the tape is still, to initiate feeding in the forward direction, first control means responsive to the sensing of the marker code signal following an information block for applying a first control signal to the tape feed control means to stop feeding of the tape, means for applying said first control signal to the printing device as an actuating signal for said scanning means, second control means responsive to the detection of an error in the sensed signals for generating a second control signal, means for applying said second control signal when generated to prevent the application of said first control signal to the tape feed control means and to said signal feeding means in the printing device to block feeding of signals to the printing mechanism, means for applying said second control signal to the tape feed control means to initiate feeding of the tape in the reverse direction after the position for recording an error code signal following said block has passed the sensing means, third control means responsive to the sensing of an error code signal for generating a third control signal and means for applying said third control signal when generated to prevent the application of said second control signal to the tape feed control means.

14. Apparatus according to claim 13 in which said printing mechanism store is a matrix of magnetic cores having a plurality of rows equal to the number of items of data in an information block, each row being capable of storing one item.

15. Apparatus for transferring data from a data bearing tape on which it is recorded, to a utilisation device, the data being recorded on the tape in discrete information blocks each of which is preceded by an associated identification block, marker code signals being recorded after each block, a gap code signal being recorded between each information block and the marker code signal following its associated identifications block, and an error code signal being recorded after the marker code signal following an incorrectly recorded block, the apparatus comprising sensing means for deriving electrical signals representing the signals recorded on the tape, means for feeding the tape in a forward and a reverse direction past the sensing means and including control means for controlling the operation of said feeding means, signal transfer means coupling the tape sensing means and the utilisation device, means for applying an initiating signal from the utilisation device to the tape feed control means to initiate feeding in the forward direction, means responsive to sensing of the gap code signal to render said ultilisation device receptive to the signals passed to it by said transfer means, first control means responsive to the sensing of the third marker code signal sensed after said initiation of forward feeding for applying a first control signal to the tape feed control means to stop feeding of the tape and then to initiate feeding in the reverse direction for a period sufficient to bring an intermediate point along the length of the preceding block opposite the sensing means, second control means responsive to the detection of an error in the sensed signals for generating a second control signal, means for applying said second control signal to prevent the application of said first control signal to the tape feed control means, means for applying said second control signal to the tape feed control means to stop feeding of the tape after the position for recording an error code signal following said third marker code signal has passed the sensing means and then to initiate reverse feeding for a period sufficient to bring an intermediate point along the length of the information block preceding the one which has just been sensed, opposite the sensing means, third control means responsive to the sensing of an error code signal for generating a third control signal and means for applying said third control signal when generated to prevent the application of the second control signal to the tape feed control means.

16. Apparatus according to claim 15 in which said first control means includes means responsive to the sensing of a marker code signal for setting a mono-stable trigger device to its unstable state, a first bi-stable device having first and second stable states and controlled by said mono-stable trigger device to change between its first and second states alternately on each occasion that the latter device is set, a second bi-stable device having first and second stable states and controlled by the first bi-stable device to change between its first and second states alternately on each occasion that the first bi-stable device changes from its second to its first state, a gating circuit having an input and an output and controlled by said second bi-stable device to be open only when that device is in its second state, means for applying a signal from the first bi-stable device to the input of said gating circuit on each occasion that the first bi-stable changes to its second state, and means for deriving said first control signal from the output of the gating circuit.

17. Apparatus according to claim 16 which further includes a first gating means which is normally open, means for applying said first control signal to the tape feed control means through said first gating means and means for applying said second control signal when generated to close said first gating means.

18. Apparatus according to claim 17 which further includes a second gating means, means for applying said first control signal to open said second gating means, means for applying said second control signal to be passed by said second gating means to the tape feed control means.

19. Apparatus according to claim 18 which further includes a third gating means which is normally open and is coupled between said second gating means and the tape feed control means and means for applying said third control signal to close said third gating means.

20. Apparatus for printing data sensed from a data bearing tape on which it is recorded, the data being recorded on the tape in discrete information blocks each of which is preceded by an associated identification block, marker code signals being recorded after each block, a gap code signal being recorded between each information block and the marker code signal following its associated identification block, and an error code signal being recorded after the marker code signal following an incorrectly recorded block, the apparatus comprising sensing means for deriving electrical signals representing the signals recorded on the tape, means for feeding the tape in a forward and a reverse direction past the sensing means and including control means for controlling the operation of said feeding means, a continuously running cyclically operating printing device including a signal store, a printing mechanism, means responsive to the receipt of an actuating signal for scanning said store in the cycle of operation immediately following receipt of said actuating signal to read out signals stored therein, means for feeding said signals to the printing mechanism and means for generating an initiating signal at the commencement of each said cycle, signal transfer means coupling the tape sensing means and the input to said store to transfer signals sensed from the tape to the store in a predetermined order, means for feeding said initiating signals from the printing device to the tape feed control means, means within the tape feed control means responsive to an initiating signal only when the tape is still, to initiate feeding in the forward direction, means responsive to sensing of the gap code signal for rendering said signal transfer means operative only for the duration of the succeeding information block, first control means responsive to the sensing of the third marker code signal sensed after said initiation of forward feeding for applying a first control signal to the tape feed control means to stop feeding of the tape and then to initiate feeding in the reverse direction for a period sufficient to bring an intermediate point along the length of the preceding block opposite the sensing means, means for applying said first control signal to the printing device as an actuating signal for said scanning means, second control means responsive to the detection of an error in the sensed signals for generating a second control signal, means for applying said second control signal when generated to prevent the application of said first control signal to the tape feed control means and to said signal feeding means in the printing device to block feeding of signals to the printing mechanism, means for applying said second control signal to the tape feed control means to stop feeding of the tape after the position for recording an error code signal following said third marker code signal has passed the sensing means and then to initiate reverse feeding for a period sufficient to bring an intermediate point along the length of the information block preceding the one which has just been sensed, opposite the sensing means, third control means responsive to the sensing of an error code signal for generating a third control signal and means for applying said third control signal when generated to prevent the application of the second control signal to the tape feed control means.

21. Apparatus according to claim 20 in which said printing mechanism store is a matrix of magnetic cores having a plurality of rows equal to the number of items of data in an information block, each row being capable of storing one item.

22. Apparatus according to claim 20 in which said first control means includes means responsive to the sensing of a marker code signal for setting a mono-stable trigger device to its unstable state, a first bi-stable device having first and second stable states and controlled by said mono-stable trigger device to change between its first and second states alternately on each occasion that the latter device is set, a second bi-stable device having first and second stable states and controlled by the first bi-stable device to change between its first and second states alternately on each occasion that the first bi-stable device changes from its second to its first state, a gating circuit having an input and an output and controlled by said second bi-stable device to be open only when that device is in its second state, means for applying a signal from the first bi-stable device to the input of said gating circuit on each occasion that the first bi-stable device changes to its second state, and means for deriving said first control signal from the output of the gating circuit.

23. Apparatus according to claim 22 in which said gap code signal comprises a predetermined number of like characters recorded on the tape in succession, and said gap code responsive means comprises means responsive to the sensing of any character for generating an output pulse, a gating circuit to which said pulses are applied, means for applying control potentials from said first and second bi-stable devices to said gate circuit to open it only when the first one is in its first state and the second one is in its second state, a pulse counter, means for applying the output pulses from the gate circuit to the pulse counter, and means for deriving a control potential from said counter to render said signal transfer means operative only after the counter has counted a number of pulses equal to said predetermined number.

References Cited in the file of this patent

UNITED STATES PATENTS

| | | |
|---|---|---|
| 2,706,215 | Van Duuren | Apr. 22, 1955 |
| 2,708,267 | Weidenhammer | May 10, 1955 |
| 2,782,398 | West et al. | Feb. 19, 1957 |
| 2,793,344 | Reynolds | May 21, 1957 |